Oct. 21, 1969   H. MIRTAIN   3,473,594
PNEUMATIC TIRES AND BREAKERS THEREFOR
Filed March 23, 1967   2 Sheets-Sheet 1
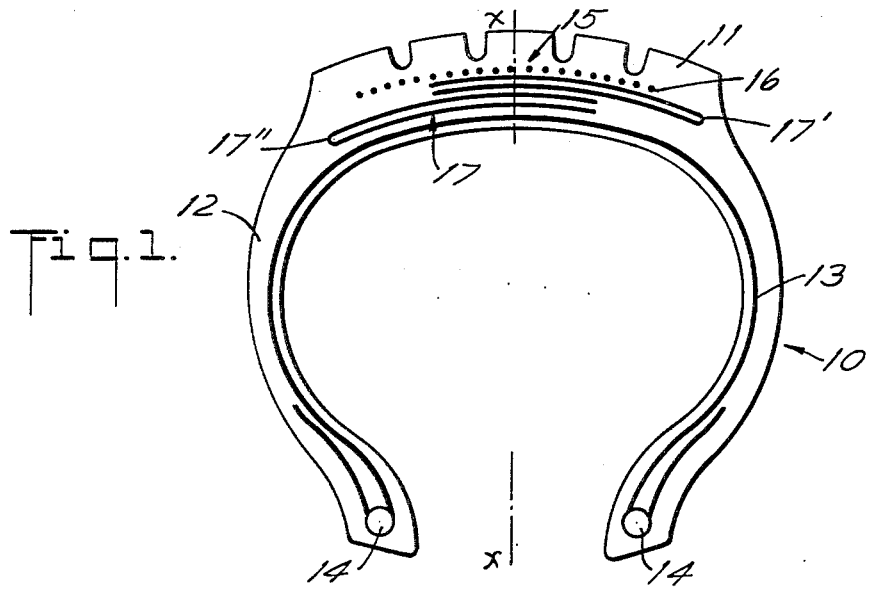
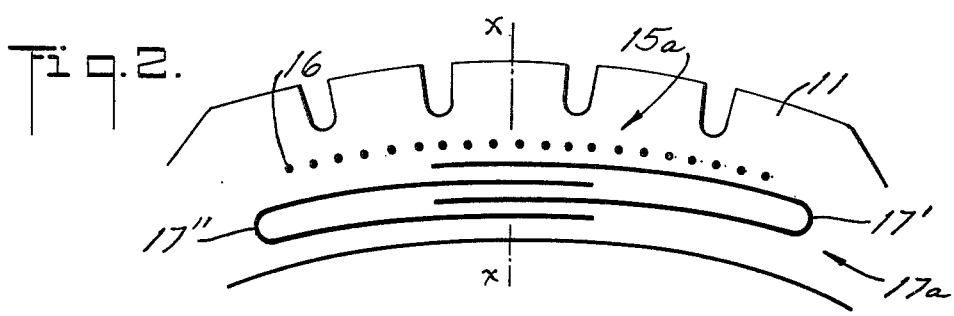
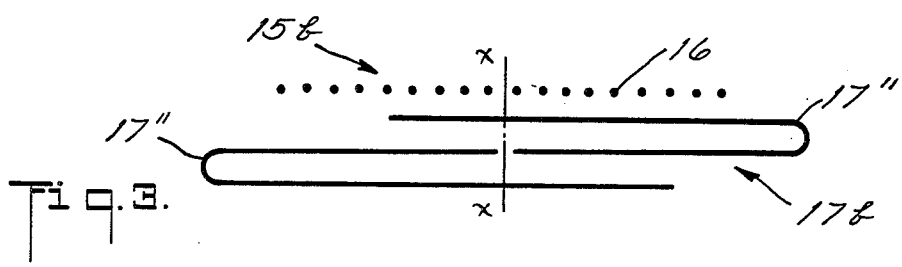
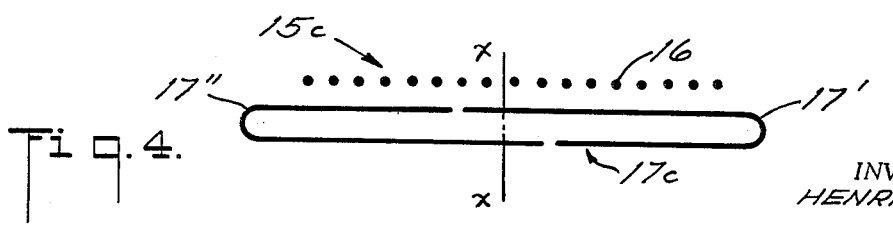
INVENTOR.
HENRI MIRTAIN
BY Norbert P. Holler
ATTORNEY 3,474,594
PNEUMATIC TIRES AND BREAKERS THEREFOR
Henri Mirtain, Compiegne, France, assignor to Uniroyal Englebert France S.A., Paris, France, a corporation of France
Filed Mar. 23, 1967, Ser. No. 625,433
Claims priority, application France, Mar. 30, 1966, 55,611
Int. Cl. B60c 9/18
U.S. Cl. 152—362        8 Claims

ABSTRACT OF THE DISCLOSURE

A radial ply tire construction having a multi-ply tread-reinforcing breaker immune to lateral ply separation is disclosed. At least the radially outwardmost one of the breaker ply structures is made of filiform elements of an inextensible and incompressible material such as metal, and at least one other breaker ply structure interposed between the outwardmost ply structure and the crown region of the tire carcass is made of filiform elements of a textile or like material, the second-named ply structure being composed of sheet material folded back over itself, with the folded edges defining the opposite side edges of that ply structure and being located in the shoulder regions of the tire. The width of the ply structure of the inextensible and incompressible material is less than that of the ply structure of the textile material which is substantially equal to that of the tread, and the unfolded edge regions of the sheet material constituting the latter ply structure are confined under the outermost ply structure.

BACKGROUND OF THE INVENTION

This invention relates to pneumatic tires for vehicles and more particularly to tread reinforcements or breakers for the type of tires generally called "radial" or "radial ply" tires.

The expressions "radial tires" and "radial ply tires" as commonly used in the pneumatic tire art may be said to include various tire constructions having a carcass or body comprising one or more reinforcement plies of weftless cord fabric extending from bead to bead wherein the cords in each ply are substantially radial in orientation, i.e. the cords are oriented substantially normal to the beads and the crown centerline of the tire. In a monopoly radial tire construction, the carcass or body cords normally have a 90° bias angle, i.e. in the unshaped carcass they extend perpendicular to the planes of the beads. In a two-ply radial tire construction, the cords in each body ply are usually oriented at oppositely disposed small angles of up to 10° with respect to the perpendicular to the bead planes, in which case the respective body plies are said to have oppositely disposed bias angles of 80° or greater (but less than 90°). In four-ply or heavier radial tire constructions, similar opposed orientation of the cords in successive body plies is usually employed. All of these body or carcass constructions are contemplated within the scope and meaning of the expressions "radial" and "substantially radial" as used herein.

Radial tires are also generally provided with a tread reinforcement comprising a breaker or belt interposed between the tread and the crown region of the carcass, such breaker being comprised of one or more plies of rubberized, usually weftless, cord fabric. In such a breaker ply, the cords are made of generally inextensible materials, e.g. metallic wires, glass filaments, polyester filaments, etc., and are both parallel to each other as well as oriented at a low bias angle, i.e. they are oriented substantially parallel to the bead planes and thus circumferentially of the tire. In the case of a monopoly breaker structure, this bias angle may be 0°, but in the most usual case, where the breaker is a multi-ply structure, similar but opposed low bias angle orientations of the cords, ranging up to about 10° to the median circumferential plane of the tire, are employed in successive plies.

For normal uses, the traditional breakers made up of a plurality of plies of rubberized metallic wires or cords, in each of which plies the cords are parallel to one another and oriented at a respective low bias angle relative to the median circumferential plane of the tire, give excellent results. It has been noticed, however, that it is otherwise when tires of this type are subjected to higher than normal speeds. Tests carried out on testing machines have shown that the lateral edges of these plies have a tendency to separate as the speed approaches 240 kilometers per hour (approximately 150 m.p.h.), a speed which many passenger vehicles may be able to attain in the not too distant future.

In order to overcome this disadvantage, it has been proposed to reduce the width of the breaker plies to such an extent as to prevent their lateral edges from being located in the respective zones of the tire subjected to maximum deformation or flexure stresses during use, i.e. in the shoulder of the tire. This expedient, however, entails the result that the force of slip, which is a function of the lateral rigidity of the tire, decreases with the width of the plies, whereby the cornering power or road holding ability of the tire is adversely affected.

It has also been observed that the use of breaker plies which are made of non-metallic cords and which are folded back over themselves along the marginal edges gives good results as far as transverse rigidity is concered without entailing any substantial risk of ply separation, but that tires so constructed have a service life, expressed in kilometers, which is about 40% below that of tires with a metal breaker.

SUMMARY OF THE INVENTION

It is the object of the present invention, therefore, to provide a radial ply tire construction which will be characterized by satisfactory cornering power at high speeds while possessing excellent wear resistance, to which end there is placed under the tread a reinforcing breaker characterized by a high resistance to separation of its plies.

Generally speaking, the tread reinforcement or breaker for a radial ply tire is, in accordance with the principles of the present invention, basically characterized by the fact that at least the radially outwardmost one of the breaker ply structures is made of filiform elements such as wires, cords, strands, tapes, etc. made of an inextensible and incompressible material, e.g. metal, while at least another of the breaker ply structures located radially inwardly of the said outwardmost ply structure is composed of filiform elements (or felted fibers) of a textile or like material and has its lateral edges defined by folded over marginal regions, the width of the ply structure of inextensible and incompressible material being less than that of the ply structure of textile material between the fold line edges of the latter, and the unfolded edge regions of the sheet material constituting the latter ply structure being confined under the said outwardmost ply structure. There may, of course, be more than one of either of these types of ply structures, and two types of ply structures may be alternated or arranged in superposed groups of the same nature. The orientations of plies of different types may be symmetrical with respect to the median circumferential or equatorial plane or, they may be differently oriented in order to achieve any desired rigidity of structure. The unfolded marginal regions of the sheet material constituting the textile ply structure may overlap or be in edge to edge facing relation in the vicinity of the median circumferential plane.

BRIEF DESCRIPTION OF THE DRAWINGS

The foregoing and other objects, characteristics, and advantages of the present invention will be more clearly understood from the following detailed description thereof when read in conjunction with the accompanying drawings, in which:

FIG. 1 is a cross-sectional view of a radial ply tire and illustrates a breaker ply arrangement according to one aspect of the present invention;

FIG. 2 is a fragmentary cross-sectional view, on a greatly enlarged scale, of the tread region of a radial ply tire characterized by a somewhat modified textile breaker ply arrangement according to the preesnt invention;

FIGS. 3 and 4 are diagrammatic illustrations of still further modified textile breaker ply arrangements according to the present invention;

DESCRIPTION OF PREFERRED EMBODIMENTS

Figure 5:
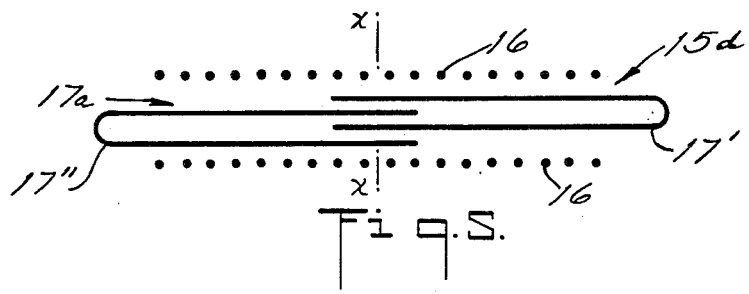
FIGS. 5, 6 and 7 are diagrammatic illustrations of modified versions of the breaker constructions shown in FIGS. 2, 3 and 4, respectively.

Referring now to the drawings in greater detail, there is shown in FIG. 1 a tire 10 comprising a tread 11 and sidewalls 12 overlying a carcass 13 composed of one or more plies or rubberized tire cords extending substantially radially between a pair of beads 14, i.e. at a relatively high bias angle to the median circumferential plane $x$—$x$. The tire 10 also comprises a multi-ply tread-reinforcing breaker, the details of which will be more fully described presently, interposed between the tread 11 and the crown region of the carcass 13.

In accordance with the basic principles of the present invention, the breaker for such a radial ply tire comprises two types of ply structures, one type being made of cords or other filiform elements of an inextensible and incompressible material, for example steel wires, and the other type being made of cords or other filiform elements or felted fibers of a textile material, for example rayon, polyester, nylon, glass fiber, and the like. Of these types of poly structures, the former is generally somewhat, but not more than 10%, narrower than the latter and in particular has a width which is between approximately 90 and 98% of the width of the overlying tread, while the width of the textile ply structure is generally equal to that of the tread. Thus, the lateral edges of the textile ply structpre, which are defined by folded over portions of rubberized cord fabric, are preferably located directly in the zones of maximum flexure, i.e. the shoulders, and enhance the transverse rigidity of the tire. This ply structure, however, by virtue of the folding, is immune to ply separation. Concomitantly, the lateral edges of the metal ply structure are removed from these zones but only to an extent sufficient to minimize flexing while retaining the maximum measure of cornering power and wear resistance attianable under the circumstances.

Refering now again to FIG. 1, the breaker 15 according to one aspect of the present invention comprises an outer ply structure 16 of metallic cords, wires, cables or like filiform elements and an inner ply structure 17 of textile cords, strands or like filiform elements. As clearly shown in FIG. 1, the metal ply structure 16 comprises a single ply which is narrower than the tread 11. On the other hand, the textile ply structure 17 comprises a pair of ply sections 17' and 17" composed of respective sheets of ruberized tire cord fabric folded in half and so arranged that the width of the structure between the respective folds, which constitute the lateral edges thereof, is greater than that of the metal ply structure and generally equal to that of the tread. The unfolded edge regions of the ply sections 17' and 17" overlap in the vicinity of the median circumferential plane $x$—$x$ but terminate short of the side edges, i.e. within the confines, of the metal ply 16. Thus, the ply structure 17 is provided with four plies over most of its expanse and with only two plies in its marginal regions, but all risk of ply separation at any point, including the shoulders of the tire, is effectively eliminated.

Within the purview of the present invention, of course, the breaker construction is susceptible to a great number of variations and modifications. Merely by way of example, as illustrated in FIG. 2, the textile ply structure 17a there shown comprises a pair of ply sections 17' and 17" composed of folded over sheets the free edge regions of which are interleaved with and overlap one another in the vicinity of the median equatorial plane $x$—$x$. In the variant of the invention illustrated in FIG. 3, the textile ply structure 17b of the breaker 15b comprises a pair of ply sections 17' and 17" composed of two sheets folded in such a manner that the free marginal regions of the middle reaches of the two sheets are in edge to edge facing relationship substantially at the median equatorial plane $x$—$x$ while the free marginal regions of the outer reaches of the sheets are in overlapping relation to one another as well as to those of the middle reaches and terminate at opposite sides of the median plane. In the variant according to FIG. 4, the textile ply structure 17c of the breaker 15c comprises a pair of ply sections 17' and 17" composed of two sheets folded over and positioned so that their respective free marginal regions are in edge to edge facing relationship, with the two facing pairs of edges being disposed at opposite sides of the median equatorial plane $x$—$x$.

Figure 6:
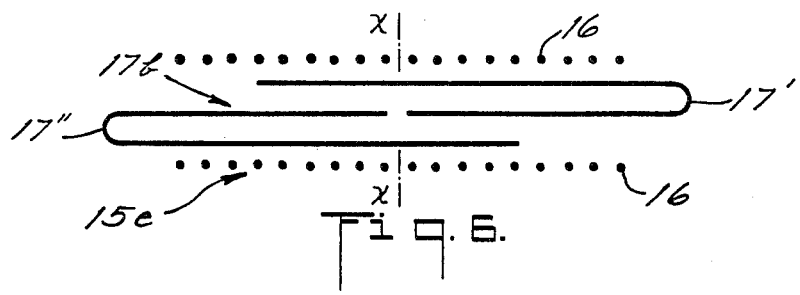
Figure 7:
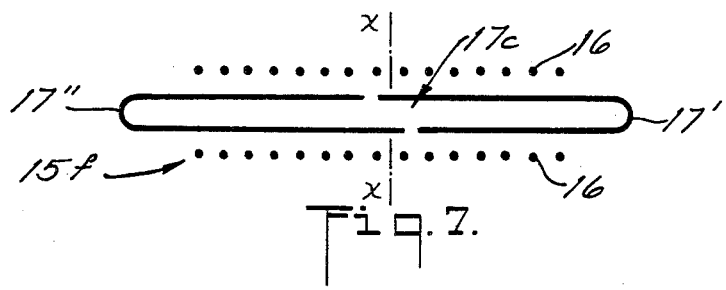
Figure 8:
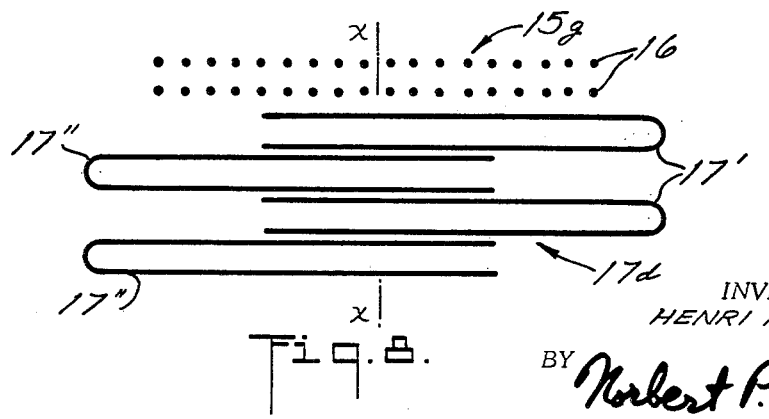
FIG. 8 is a diagrammatic illustration of yet a further modified breaker ply arrangement according to the present invention.

Still further modifications of the breaker construction according to the present invention are illustrated in FIGS. 5, 6 and 7 where the breakers 15d, 15e and 15f are shown to comprise the respective textile ply structure arrangements of FIGS. 2 to 4 but in association with a two-ply metal ply structure 16 of which the second metal ply is spaced from the first ply and underlies the associated one of the textile ply structures 17a, 17b and 17c. In FIG. 8, the breaker 15g is shown as comprising a two-ply metal ply structure both plies of which overlie a textile breaker structure 17d composed of two superposed pairs of ply sections 17' and 17" arranged in the manner of the structure 17 of FIG. 1. Still other variations in respect of both number and arrangement of the plies will readily suggest themselves to those skilled in the art.

It will be understood that in any of the embodiments of the invention described herein, as in traditional breakers, the cords or other filiform elements in the metal plies and the textile plies may be inclined symmetrically with respect to the median equatorial plane $x$—$x$, i.e. at equal low bias angles, but it is deemed within the contemplation of the present invention that cord bias angles in the different plies which are asymmetrical with respect to said plane may be utilized.

With respect to any of the breaker constructions falling within the scope of the present invention, therefore, the principal criteria to be observed, in view of the fact that the basic objective of the present invention is to eliminate the possibility of ply separation in the breaker without appreciably reducing the other structural and operational characteristics of the tire, are (a) that, with a metal ply being the radially outwardmost element of the breaker, i.e. closest to the tread, all metal reinforcements are removed from the main flexure zones located in the vicinity of the shoulders of the tire, and (b) that for the reinforcement of these zones there are provided one or a plurality of folded-back textile ply elements which are located intermediate the said outwardmost ply and the crown region of the carcass of the tire, and the unfolded edge regions of which are confined under the said outwardmost ply. Stated in other words, the metal plies must be narrower than the tread, and the textile plies must be wider than the metal plies and should preferably be at least as wide as the tread, although they may be slightly narrower or wider than the tread.

It is to be understood that the foregoing description of preferred embodiments of the present invention is for purposes of illustration only, and that the structures herein disclosed are susceptible to a number of changes and modifications none of which entails any departure from the spirit and scope of the present invention.

Having thus described my invention, what I claim and desire to secure by Letters Patent is:

1. A pneumatic tire, comprising a radial ply carcass, a tread overlying the crown region of said carcass, and a tread-reinforcing breaker interposed between said tread and said carcass, said breaker comprising at least one first ply structure located radially outwardmost of said carcass and made of filiform elements of an inextensible and incompressible material, and at least one second ply structure located radially inwardly of said first ply structure intermediate the same and said crown region of said carcass and made of filiform elements of a textile or like material, the lateral edges of said second ply structure being defined by folds in sheet material constituting said second ply structure, the width of said first ply structure being less than that of said tread, the width of said second ply structure as measured between the fold line edges thereof being greater than the width of said first ply structure, and all unfolded edge regions of said sheet material constituting said second ply structure being confined under said first ply structure.

2. A tire according to claim 1, wherein said filiform elements of said first ply structure are metallic, and said filiform elements of said second ply structure are composed of a material selected from the group consisting of nylon, rayon, polyester and glass fiber.

3. A tire according to claim 1, wherein said first ply structure consists of a single ply while said second ply structure includes a plurality of plies.

4. A tire according to claim 1, wherein the width of said first ply structure is between about 90 and 98% of the width of said tread, and wherein the width of said second ply structure is substantially equal to the width of said tread.

5. A tire according to claim 1 said unfolded edge regions of the folded over sheet material overlapping in the vicinity of the median circumferential plane of the tire.

6. A tire according to claim 1, said unfolded edge regions of the folded over sheet material being in edge to edge facing relation in the vicinity of the median circumferential plane of the tire.

7. A tire according to claim 1, wherein there are provided at least two first ply structures, the two types of ply structures being arranged in an alternating sequence.

8. A tire according to claim 1, wherein there are provided at least two ply structures of each of the two types, the two types of ply structures being arranged in superposed groups of the same nature.

References Cited

FOREIGN PATENTS

| 1,299,622 | 6/1962 | France. |
| 1,427,886 | 1/1966 | France. |
| 1,435,170 | 3/1966 | France. |
| 808,548 | 2/1959 | Great Britain. |

ARTHUR L. LA POINT, Primary Examiner

C. B. LYON, Assistant Examiner

U.S. Cl. X.R.

152—354